United States Patent
Love et al.

(10) Patent No.: US 7,929,921 B2
(45) Date of Patent: Apr. 19, 2011

(54) DIVERSITY CONTROL IN WIRELESS COMMUNICATIONS DEVICES AND METHODS

(75) Inventors: Robert T. Love, Barrington, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 229 days.

(21) Appl. No.: 10/458,701

(22) Filed: Jun. 10, 2003

(65) Prior Publication Data

US 2004/0253955 A1 Dec. 16, 2004

(51) Int. Cl.
H03C 7/02 (2006.01)

(52) U.S. Cl. ........ 455/101; 455/140; 455/137; 455/273; 455/132; 455/141; 455/272; 455/274; 455/275; 455/69; 455/442; 455/277.1; 375/267; 375/148; 375/150

(58) Field of Classification Search ................ 455/575.7, 455/574, 138, 135, 136, 164.2, 183, 226.1, 455/226.2, 101, 140, 137, 273, 272; 370/347, 370/321; 375/345, 346, 349, 366, 267

See application file for complete search history.

(56) References Cited

U.S. PATENT DOCUMENTS

| | | | |
|---|---|---|---|
| 4,704,734 A | 11/1987 | Menich et al. | |
| 4,726,050 A | 2/1988 | Menich et al. | |
| 5,109,390 A | 4/1992 | Gilhousen et al. | |
| 5,303,400 A | 4/1994 | Mogi | |
| 5,345,602 A | 9/1994 | Wiedemann et al. | |
| 5,640,414 A | 6/1997 | Blakeney, II et al. | |
| 5,710,995 A | 1/1998 | Akaiwa et al. | |
| 5,740,526 A | 4/1998 | Bonta et al. | |
| 5,859,870 A | 1/1999 | Tsujimoto | |
| 6,141,536 A | 10/2000 | Cvetkovic et al. | |
| 6,172,970 B1 * | 1/2001 | Ling et al. | 370/347 |
| 6,529,746 B1 | 3/2003 | Kotzin | |
| 6,577,353 B1 | 6/2003 | Welles, II et al. | |
| 6,628,930 B1 | 9/2003 | Vogt et al. | |
| 6,678,508 B1 | 1/2004 | Koilpillai et al. | |
| 6,836,660 B1 | 12/2004 | Wala | |
| 6,957,068 B2 | 10/2005 | Hutchison, IV et al. | |
| 7,072,628 B2 * | 7/2006 | Agashe et al. | 455/140 |

(Continued)

FOREIGN PATENT DOCUMENTS

CN 1272262 A 11/2000

(Continued)

OTHER PUBLICATIONS

3GPP TS 25.214 V5.40 (Mar. 2003) Technical Specification, "3rd Generation Partnership Project; Technical Specification Group Radio Access Network; Physical layer procedures (FDD) (Release 5)", 63 pages.

(Continued)

*Primary Examiner* — Charles N Appiah
*Assistant Examiner* — Randy Peaches
(74) *Attorney, Agent, or Firm* — Roland K. Bowler, II

(57) ABSTRACT

A wireless communications device (100) includes a primary radio frequency branch (134) and a diversity branch (136), which is enabled and disabled to balance performance and power consumption. Diversity mode operation of the device is controlled, for example, based on one or more of an estimated channel quality indicator, data reception, data rate, state or mode of the station, estimated signal to noise ratio of a pilot signal, battery power level, distance from a serving cell, among other factors.

26 Claims, 4 Drawing Sheets

U.S. PATENT DOCUMENTS

| | | |
|---|---|---|
| 7,116,959 B1 | 10/2006 | Link et al. |
| 7,254,378 B2 | 8/2007 | Benz et al. |
| 7,489,913 B2 | 2/2009 | Welnick et al. |
| 2002/0183086 A1 | 12/2002 | Hellmark et al. |
| 2002/0197992 A1 | 12/2002 | Nizri et al. |
| 2003/0003910 A1 | 1/2003 | McClure |
| 2003/0098468 A1 | 5/2003 | Wheeler et al. |
| 2003/0100268 A1* | 5/2003 | Moulsley et al. ............... 455/69 |
| 2004/0066754 A1* | 4/2004 | Hottinen ........................ 370/252 |
| 2004/0219959 A1* | 11/2004 | Khayrallah et al. ....... 455/575.7 |
| 2004/0253955 A1 | 12/2004 | Love et al. |
| 2005/0192009 A1 | 9/2005 | Shaheen et al. |

FOREIGN PATENT DOCUMENTS

| | | |
|---|---|---|
| CN | 1331869 A | 1/2002 |
| EP | 0072227 A2 | 2/1983 |
| EP | 0755130 A2 | 1/1997 |
| JP | 63-097023 | 4/1988 |
| JP | 06066722 A | 8/1994 |
| JP | 08503345 B2 | 4/1996 |
| JP | 2000332665 A | 11/2000 |
| WO | 9411819 A | 5/1994 |
| WO | 9905798 A1 | 2/1999 |
| WO | 9959255 A2 | 11/1999 |
| WO | WO 01/05088 A1 | 1/2001 |
| WO | 0129986 A1 | 4/2001 |
| WO | 0147126 A2 | 6/2001 |
| WO | 02093770 A1 | 11/2002 |
| WO | 03030403 A1 | 4/2003 |

OTHER PUBLICATIONS

Eurupean Patent Office Supplementary European Search Report; Jul. 14, 2009; PCT/US2004014058; 6 pages.

Japanese Patent Office Action; corresponding Japanese Patent Application No. 2006-532805; Sep. 8, 2009.

Decision of Rejection; JAPA Patent Application No. 2006-532805 dated Nov. 2, 2010, 3 pages.

* cited by examiner

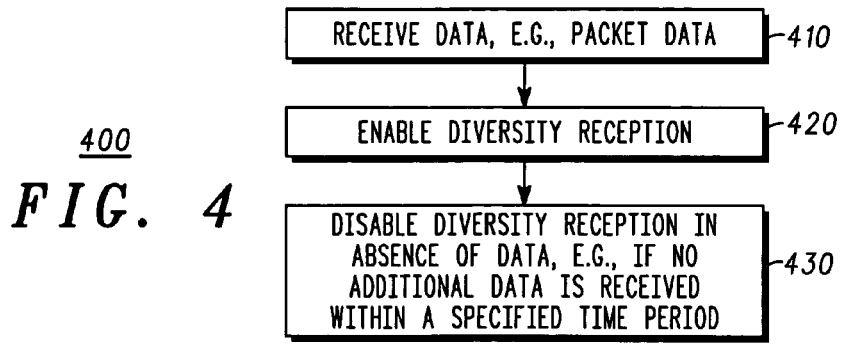
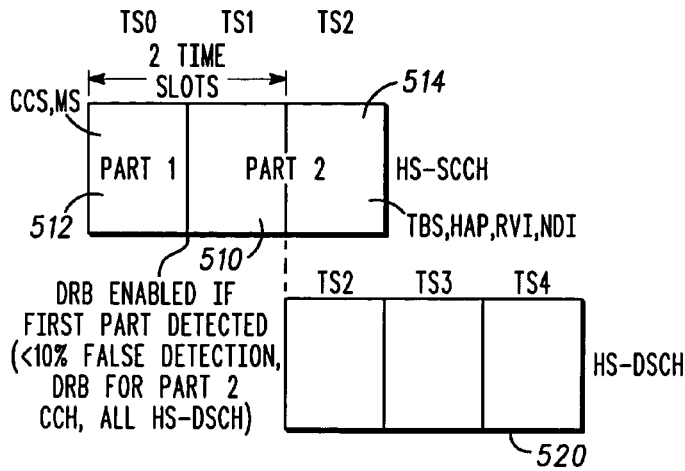
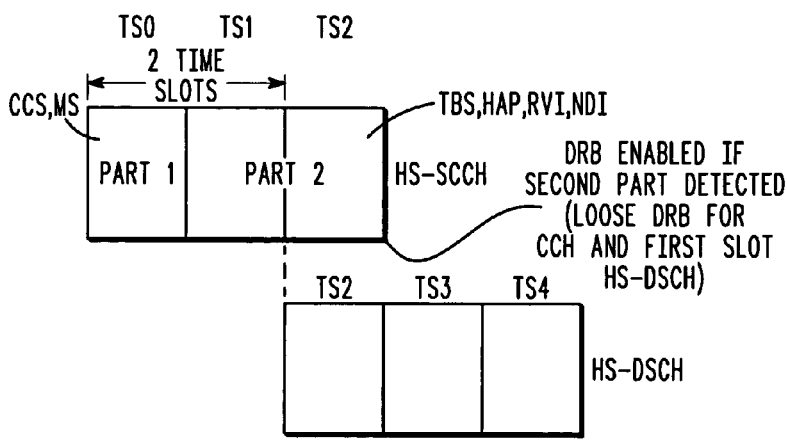
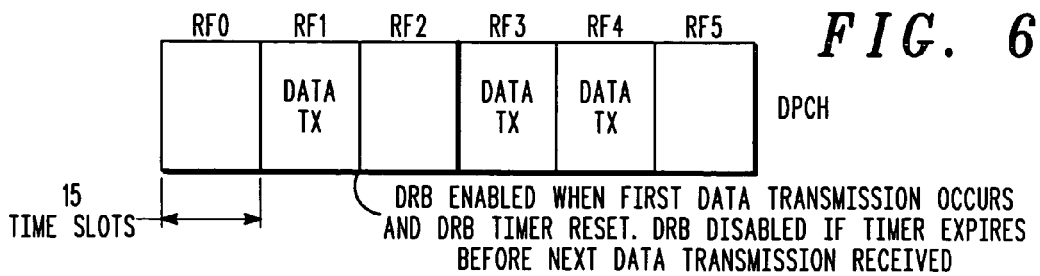

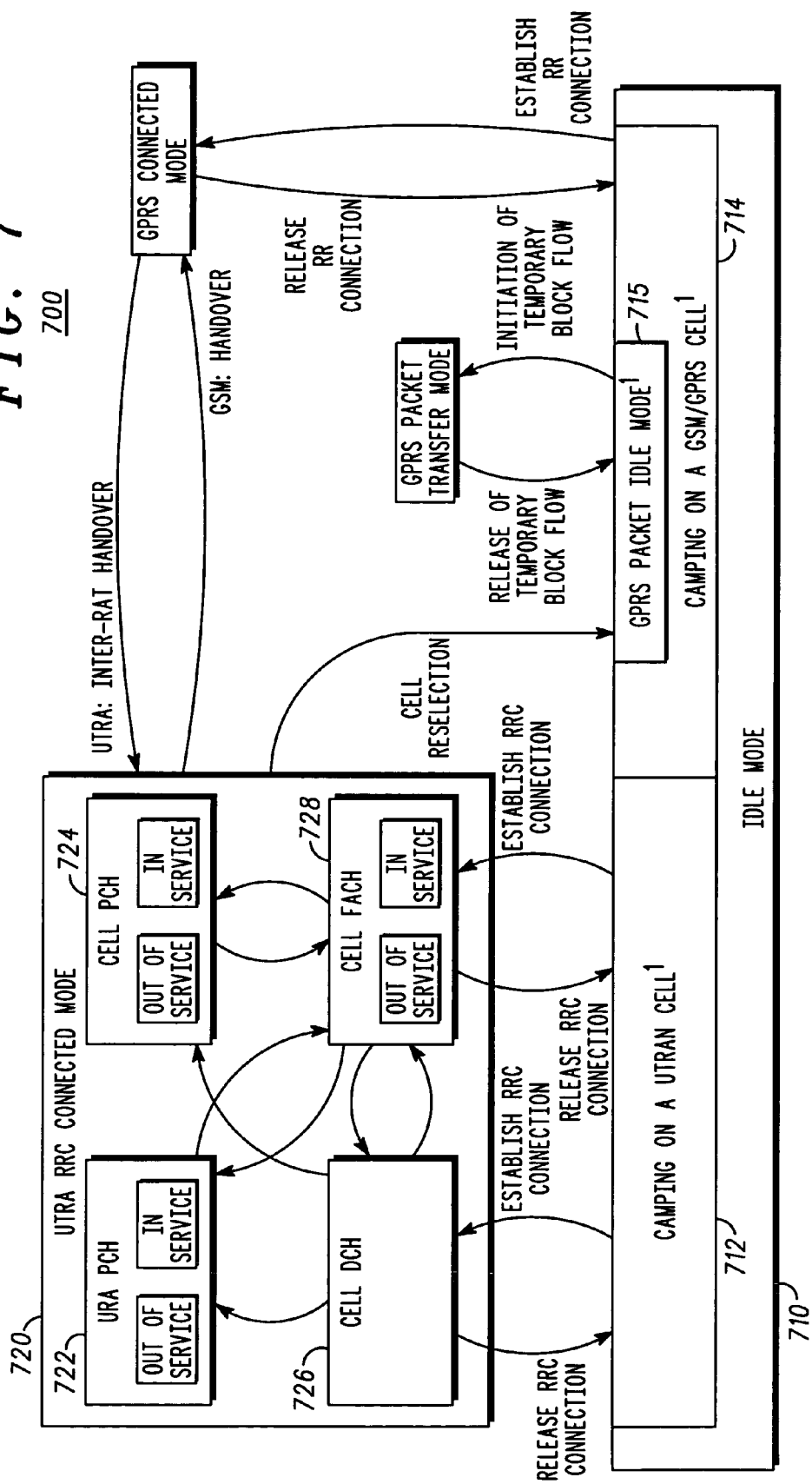

- 810 RECEIVE SIGNAL, E.G., A PILOT SIGNAL
- 820 ESTIMATE SIGNAL TO NOISE RATIO OF RECEIVED PILOT SIGNAL
- 830 ENABLE DIVERSITY IF SIGNAL TO NOISE RATIO OF RECEIVED PILOT SIGNAL IS LESS THAN A THRESHOLD

- 910 DETERMINE OR ANTICIPATE DATA RATE
- 920 CONTROL DIVERSITY OPERATION BASED ON DATA RATE

FIG. 10

TABLE 2

| TRAFFIC TYPE | CASE | ACTIVE TX TIME (SEC.) | SHO % OF INACTIVITY TIMER | SFTRHO % OF FACH>PCH | #PKTCALLS OR #CALLS PER SESSION | TIME BETWEEN SESSIONS (SEC.) | DIVERSITY ON POWER UNITS TX DURING SESSION | DIVERSITY ON/OFF POWER UNITS TX DURING SESSION | POWER UNIT SAVINGS IF PA 0mA (%) | POWER UNIT SAVINGS IF PA 100mA (%) |
|---|---|---|---|---|---|---|---|---|---|---|
| WEB TRAFFIC | NODE B INACTIVITY TIMER | 2.0 | 4 SEC. | 10 SEC. | 5 | 3600 | 0.022 | 0.0199 | 10.6 | 10.4 |
| WEB TRAFFIC | NODE B INACTIVITY TIMER | 0.2 | 4 SEC. | 10 SEC. | 4 | 3600 | 0.016 | 0.0139 | 12.0 | 11.9 |
| WEB TRAFFIC | UE INACTIVITY TIMER | 2.0 | 1 SEC. | 10 SEC. | 5 | 3600 | 0.022 | 0.0192 | 13.8 | 13.5 |
| WEB TRAFFIC | UE INACTIVITY TIMER | 0.2 | 1 SEC. | 10 SEC. | 4 | 3600 | 0.016 | 0.0133 | 15.6 | 15.5 |
| VOICE | ON IF IN SHO/SFTRHO | 180.0 | 33% | 15% | 1 | 3600 | 0.050 | 0.0456 | 8.8 | 7.7 |
| VOICE | NOT ON IF GOOD EC/LO | 180.0 | 33% | 15% | 1 | 3600 | 0.050 | 0.0470 | 5.9 | 4.8 |

FIG. 11

TABLE 3

| TRAFFIC TYPE | CASE | ACTIVE TX TIME (SEC.) | SHO % OF INACTIVITY TIMER | SFTRHO % OF FACH>PCH | #PKTCALLS OR #CALLS PER SESSION | TIME BETWEEN SESSIONS (SEC.) | DIVERSITY ON POWER UNITS TX DURING SESSION | DIVERSITY ON/OFF POWER UNITS TX DURING SESSION | POWER UNIT SAVINGS IF PA 0mA (%) | POWER UNIT SAVINGS IF PA 100mA (%) |
|---|---|---|---|---|---|---|---|---|---|---|
| WEB TRAFFIC | UE INACTIVITY TIMER+SHO | 2.0 | 1 SEC. | 10 SEC. | 5 | 3600 | 0.022 | 0.0186 | 15.5 | 15.2 |
| WEB TRAFFIC | UE INACTIVITY TIMER+SHO | 0.2 | 1 SEC. | 10 SEC. | 4 | 3600 | 0.016 | 0.0132 | 16.3 | 16.3 |
| WEB TRAFFIC | UE INACTIVITY TIMER+EC/LO | 2.0 | 1 SEC. | 10 SEC. | 5 | 3600 | 0.022 | 0.0189 | 14.9 | 14.6 |
| WEB TRAFFIC | UE INACTIVITY TIMER+EC/LO | 0.2 | 1 SEC. | 10 SEC. | 4 | 3600 | 0.016 | 0.0132 | 16.1 | 16.0 |

DIVERSITY CONTROL IN WIRELESS COMMUNICATIONS DEVICES AND METHODS

FIELD OF THE DISCLOSURE

The present disclosure relates generally to wireless communications, and more particularly to controlling diversity in wireless communications devices, for example, in W-CDMA based user equipment, to provide enhanced data rates and in some embodiments to reduce power consumption associated with enabled diversity branches in wireless receivers, and methods therefor.

BACKGROUND

It is known generally to implement diversity architectures in wireless communications devices to reduce signal fading. WO 01/05088 A1 entitled "Controlled Antenna Diversity", for example, discloses a post selection diversity scheme in wireless transceivers having spatially separated antennas based upon different level comparison techniques. In signal fading environments, the wireless transceiver in WO 01/05088 A1 selects one received signal over other received signals based upon a comparison of the received signal strength (RSS) levels, for example, just before receiving an assigned TDMA time slot. In static environments, the wireless transceiver in WO 01/05088 A1 selects one received signal over other received signals based upon a comparison of phase error estimates.

In other diversity architectures, two signals received by corresponding receiver antennas are processed simultaneously. In these diversity architectures, additional power is required for down-converting and base band processing the signal received by the parallel diversity branch. One analysis suggests that the addition of a receive diversity branch in wireless receivers increases power consumption by 15% or more.

It is known generally to reduce power consumption in a diversity receiver by selectively enabling a diversity branch in the receiver. WO 01/05088 A1 entitled "Controlled Antenna Diversity", for example, discloses enabling a diversity branch in a wireless receiver based on local or global criteria only when performance gains from diversity mode operation outweigh the corresponding increase in power consumption attending diversity mode operation. The local criteria disclosed in WO 01/05088 A1 includes measured signal to interference ratio (SIR), estimated bit error rate (BER) or frame error rate (FER), and the number of re-transmissions. The global criteria in WO 01/05088 A1 are based upon monitoring loads on various cells in the communications network for excess capacity. Cells with excess capacity may direct mobile stations to operate without diversity to reduce power consumption in the wireless receiver. In WO 01/05088 A1, networks with excess capacity may offset performance loss by mobile stations directed to operate without diversity by increasing transmission power to the mobile station.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

FIG. 4 is an alternative process for controlling diversity in a communications device.

FIG. 5 illustrates exemplary packet information.

FIG. 6 illustrates frames of data.

FIG. 7 is an exemplary state diagram for wireless mobile communications device.

FIG. 8 is another alternative process for controlling diversity in a communications device.

FIG. 9 is yet another process for controlling diversity in a communications device.

FIG. 10 is a tabular illustration of power consumption for different modes of operation.

FIG. 11 is another tabular illustration of power consumption for different modes of operation.

DETAILED DESCRIPTION

The disclosure is concerned generally with controlling diversity operation in wireless communications devices or stations, for example, in mobile user equipment operating in Universal Mobile Telephony Standards (UMTS) W-CDMA networks with High Speed Downlink Packet Access (HSDPA) service, to provide enhanced data rates and/or reduced power consumption associated with enabled diversity branches, depending on the requirements of the user.

High Speed Downlink Packet Access (HSDPA) is a packet-based data service in W-CDMA downlink with data transmission up to 14 Mbps over a 5 MHz bandwidth in the WCDMA downlink. HSDPA features include Adaptive Modulation and Coding (AMC), Hybrid Automatic Request (HARQ, fast scheduling at the Node-B and support for higher-order modulation. The $3^{rd}$ Generation Partnership Project (3GPP) standards, Release 5 specifications include HSDPA to support packet-based multimedia services. Multiple Input Multiple Output (MIMO) systems are a 3GPP work item in the Release 6 specification process, which may support even higher data transmission rates. HSDPA is evolved from and backward compatible with Release 99 WCDMA systems. The apparatuses, systems, subsystems and methods of the present disclosure may be implemented more generally in other communications environments as well, for example, in existing and future communications protocols that migrate toward or adopt HSDPA and similar services or aspects thereof including, for example, the use of a channel quality indicator (CQI), among other communications environments.

Figure 1:
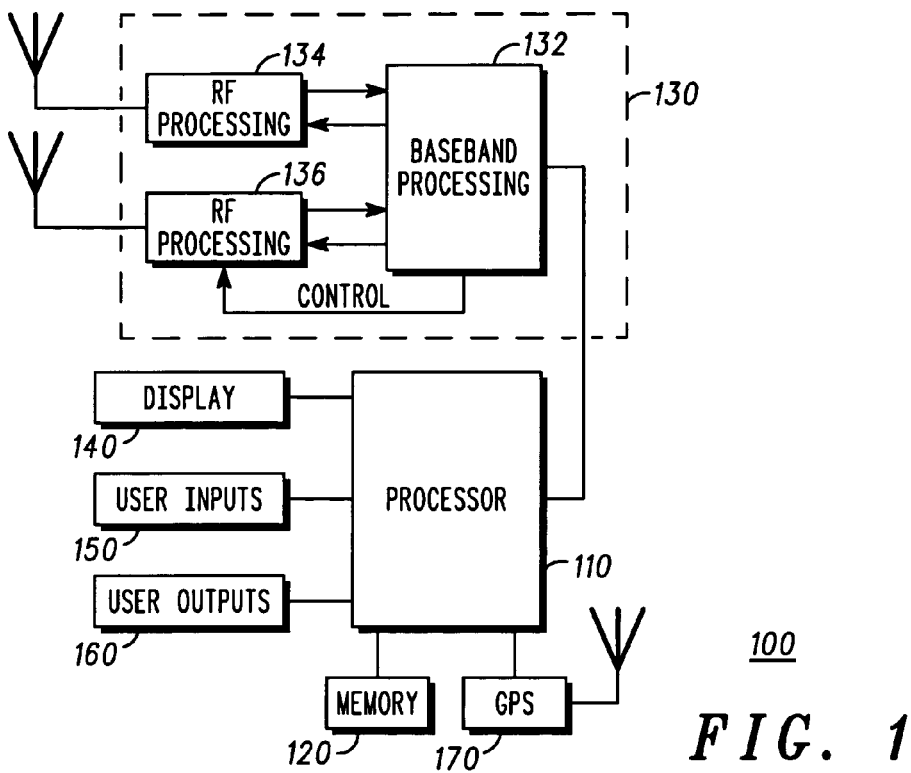
FIG. 1 is a schematic block diagram of an exemplary diversity communications device.

The exemplary mobile wireless communications device 100 of FIG. 1 includes generally a processor 110 coupled to memory 120, for example, RAM, ROM, EPROM, etc., a radio frequency (RF) transceiver 130, a display 140, user inputs 150, outputs 160, and a satellite positioning system receiver, for example, a GPS receiver 170. The transceiver 130 includes a base band processor 132, which may be shared with the exemplary GPS receiver, and first RF processor 132 and at least one other diversity RF processor branch 134, that may be selectably enabled and disabled for at least diversity reception, although in other embodiments more generally the diversity branch of the receiver may be used for diversity transmission, for example in MIMO applications.

According to one aspect of the disclosure, the wireless communications station having a diversity receive branch operates in a communications network that supports the reporting of channel quality indicator (CQI) based information, for example, a UMTS network providing HSDPA services.

In the 3GPP, Technical Specification Group Radio Access Network, Physical Layer Procedures, specification, Release 5, TS 25.214, for example, the channel quality indicator is defined at 6A.2, which provides, based on an unrestricted observation interval, that the UE shall report the highest tabulated CQI value for which a single HS-DSCH sub-frame formatted with the transport block size, number of HS-PDSCH codes and modulation corresponding to the reported or lower CQI value could be received in a 3-slot reference period ending 1 slot before the start of the first slot in which the reported CQI value is transmitted and for which the transport block error probability would not exceed 0.1. For the purpose of CQI reporting, the UE shall assume a total received HS-PDSCH power of $P_{HSPDSCH} = P_{CPICH} + \Gamma + \Delta$ in dB, where the total received power is evenly distributed among the HS-PDSCH codes of the reported CQI value, the measurement power offset $\Gamma$ is signaled by higher layers and the reference power adjustment $\Delta$ is dependent on the UE category. According to the 3GPP specification, the UE shall assume a number of soft bits available in the virtual incremental redundancy (IR) buffer (NIR), and a redundancy and constellation version parameter (XRV), which depends on the UE category. If higher layer signaling informs the UE that for the radio link from the serving HS-DSCH cell it may use a S-CPICH as a phase reference and the P-CPICH is not a valid phase reference, $P_{CPICH}$ is the received power of the S-CPICH used by the UE, otherwise $P_{CPICH}$ is the received power of the P-CPICH. If closed loop transmit diversity is used for the radio link from the serving HS-DSCH cell, $P_{CPICH}$ denotes the power of the combined received CPICH from both transmit antennas, determined as if error-free transmitter weights had been applied to the CPICH, where those weights are determined as described in sub-clause 7.2. In embodiments where open loop transmit diversity (sometimes referred to as 'STTD') is used, $P_{CPICH}$ denotes the combined CPICH power received from each transmit antenna and if no transmit diversity is used $P_{CPICH}$ denotes the power received from the non-diversity antenna. The definition of CQI in the 3GPP specification is exemplary and not intended to be limiting unless it is specifically indicated that the CQI is of the 3GPP type. Other communications protocols have or may in the future adopt other definitions of the channel quality indicator (CQI), which is more or less broad than the exemplary 3GPP definition. The use of the term channel quality herein is intended to cover the broader interpretations of channel quality indicator.

For HSDPA services, it is necessary for the user equipment to periodically, e.g. every 2 ms, signal the measured channel quality indicator back to the serving Node-B while in the CELL_DCH state. To measure the channel quality indicator and have it reflect diversity operation requires that the diversity branch be active. However, user equipment could run in non-diversity mode and bias the resulting channel quality measurement by 3 dB for reporting and then only enable the diversity branch when detecting the first part of the HS-SCCH and then keep it enabled until the user equipment or Node-B inactivity timer expires. Alternatively, the diversity branch is only enabled during the channel quality indicator reference periods (instead of biasing the channel quality indicator with the diversity branch disabled) and the diversity branch is enabled after detecting the HS-SCCH first part and disabled after an inactivity timer expires, as discussed further below.

Figure 2:
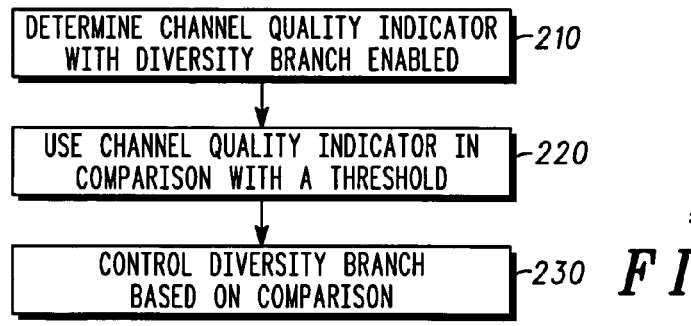
FIG. 2 is an exemplary process for controlling diversity in a communications device.

In the process diagram 200 of FIG. 2, at block 210, the user equipment determines a channel quality indicator (CQI) with the diversity receive branch enabled, for example, when the RF receive processor branch 136 in FIG. 1 is enabled. At block 220, the channel quality indicator determined with the diversity receive branch enabled, at block 210, is used in a comparison with a threshold. At block 230, the diversity receive branch, for example, the RF processor 136 in FIG. 1, is controlled, e.g., either enabled or disabled, based upon the comparison of the channel quality indicator with the threshold at block 220.

In one embodiment, the channel quality indicator determined with the diversity receive branch enabled at block 210 in FIG. 2, in a comparison with the first threshold is performed by comparing the channel quality indicator determined with the diversity receive branch enabled with a threshold at block 220. Such a comparison is absolute. In another embodiment, the comparison at block 220 is a relative comparison. According to this embodiment, a difference channel quality indicator is determined based on a difference between channel quality indicators determined with the diversity receive branch enabled and with the diversity receive branch disabled. In the relative comparison embodiment, the threshold is a first difference threshold. Thus the channel quality indicator difference is compared with the difference threshold.

In one embodiment, the diversity receive branch is enabled when the Channel Quality Indicator based comparison meets or exceeds the threshold, and the diversity receiver branch is disabled when the channel quality indicator based comparison does not exceed the threshold. For example, where the comparison is absolute, the diversity receive branch is operated when the channel quality indicator exceeds the threshold, and the diversity receive branch is not operated when the channel quality indicator does not exceed the threshold. In embodiments where the comparison is relative, the diversity receive branch is operated when the channel quality indicator difference exceeds the different threshold, and the diversity receive branch is not operated when the channel quality indicator difference does not exceed the difference threshold. In systems exhibiting hysteresis, the thresholds for enabling and disabling the diversity receive branch are generally different.

Figure 3:
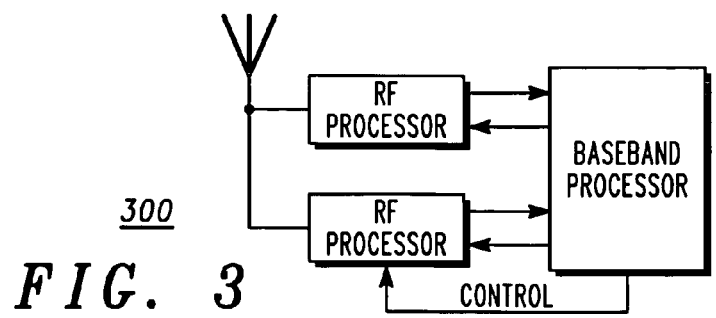
FIG. 3 is a schematic block diagram of an alternative diversity transceiver.

In an alternative transceiver 300 illustrated in FIG. 3 a primary receive branch 310 and a diversity receive branch 320 are both coupled to a single common antenna subsystem 330 and to a base band processor 340, which is capable of controlling the diversity receive branch 320. The antenna subsystem need not comprise two spatially separated antennas and may, for example, comprise a single physical apparatus able to synthesize two distinct received signals on the basis of separation according to phase diversity, i.e. where one output signal is related to the impinging E-field and the second output signal is related to the impinging H-field, or according to polarization diversity. The methods or processes of FIG. 2 are thus applicable to diversity architectures of the type illustrated in FIGS. 1 and 3.

According to another aspect of the disclosure, diversity is controlled based upon whether or not data is received, for example, diversity is enabled when data is received and diversity is disabled otherwise. In one embodiment, for example, the mobile communications station having diversity reception capability enables diversity reception in the wireless communications station upon receiving packet information. In the process 400 of FIG. 4, at block 410, the communications device receives data, for example packet data. At block 420, diversity is enabled when data is received. And at block 430, diversity reception is disabled when packet information is not received, for example, if no additional packet information is received within a specified time period or interval after receiving packet information. In one embodiment, the timer period is set in relation to the frame rate of the data, or alternatively it may be set according to some other characteristic of the data or the rate or pattern with which the data is, or has in the past been, received.

FIG. 5 illustrates an exemplary 3GPP packet transmission including a High-Speed Shared Control Channel (HS-SCCH) packet 510 and a corresponding High-Speed Downlink Shared Channel (HS-DSCH) 520. The exemplary HS-SCCH packet comprises a first part 512 in a single time slot or sub-frame, T0, and a second part 514 extending over two time slots or sub-frames, T1 and T2. The exemplary HS-SCCH packet 520 comprises a data packet over time slots, T2, T3 and T4.

In one embodiment, generally, the diversity receive branch is enabled upon detecting the control channel, for example the HS-SCCH of FIG. 5, associated with the packet data. In one particular implementation, the diversity receive branch is enabled upon detecting a portion of the control channel message, for example the first part 512 of the HS-SCCH of FIG. 5. In another embodiment of a more particular implementation, the diversity receive branch is enabled upon detecting a second portion of the control channel message, for example, the second part 514 of the HS-SCCH of FIG. 5. In the embodiment, where diversity is enabled upon detecting the second portion of the control channel message, diversity may not be enabled during receipt of the first portion of the packet data block. In FIG. 5, for example, a portion of the data packet 520 is received during a time slot that overlaps with receipt of the second part 514 of the control channel message 510. In a related embodiment, diversity mode is disabled if the second part 514 fails a cyclic redundancy check (CRC) or other integrity check. Diversity reception may also be disabled upon demodulating the received information.

According to a related aspect of the disclosure, a timer is set upon receiving the data, or packet information, and diversity is disabled if the timer expires. In one embodiment, the timer is re-set when the next packet information is received, for example, upon detecting the next control channel message associated with the next data packet. In FIG. 6, for example, data received on a dedicated channel, for example, the Dedicated Physical Channel (DPCH). In FIG. 6, the timer is set when the first data (Tx) in frame RF1 is received, and the timer is reset when the next data (Tx) in frame RF3 is received. The time period may be set in relation to the frame period depending upon the number of frames during which the user is willing to tolerate the charge consumption associated with diversity reception in the absence of data. In one exemplary embodiment, for example, the time period may be one or two frame periods.

According to another aspect of the disclosure, diversity is controlled based upon the operating mode of the communications device. Many devices operate in active, idle or dormant, and intermediate modes. FIG. 7 is an exemplary state diagram 700 for a UTMS wireless communications device. The diagram illustrates an idle mode state 710 where the device may be camped on a Universal Terrestrial Radio Access Network (UTRAN) cell or on a Global System for Mobile (GSM) communications network with General Packet Radio Service (GSM/GPRS) 714, which includes a GPRS packet idle mode state 715. The diagram also illustrates a Universal Terrestrial Radio Access (UTRA) radio resource connected (RRC) mode and its different states, including a universal radio access paging channel state (URA_PCH) 722, a cell paging channel state (CELL-PCH) 724, a cell dedicated channel (CELL_DCH) state 726 and a cell forward access channel (CELL_FACH) state 728. The exemplary CELL_FACH state 728 is an intermediate state between active and idle modes. CELL_FACH state 728 transitions between UTRAN camped idle mode 712 and the other states of the UTRA RRC connected mode.

In one embodiment, diversity receive mode capability is controlled upon transitioning to and from the intermediate state, for example, to and from the CELL_FACH state 728 in the exemplary architecture of FIG. 7. In one embodiment, diversity mode is disabled in the intermediate state. In another embodiment, whether diversity mode operation is enabled or disabled depends upon the state prior to transitioning to the intermediate state. For example, diversity mode may be disabled if the transition is from an active mode to the intermediate mode, and diversity mode may be enabled if the transition is from an idle mode to the intermediate mode.

In a related embodiment, diversity receive mode capability is controlled, i.e., enabled or disabled, before and after transitioning to and from the intermediate state in applications where there is an indication that the transition will soon occur and/or in applications where predictions may be made as to when the transitions will occur. Thus controlling diversity receive mode capability when transitioning to and from the intermediate state includes enabling and disabling diversity mode operation upon transitioning, prior to the transition, and after the transition to and from the intermediate state.

In the exemplary UMTS communications architecture, illustrated in FIG. 7, the diversity receive mode is disabled once in the CELL_FACH state to save power consumption and improve battery life. In the CELL_DCH state, an inactivity timer may be set at the end of the last received data transmission, and the inactivity timer is reset upon the reception of each new data transmission, for example, upon successful reception of Part-2 510 of the HSDPA High Speed Shared Control Channel or HS-SCCH in FIG. 5. The diversity branch is turned off if the timer expires. In HSDPA, the diversity branch could be enabled after the first part of the HS-SCCH has been detected, or if a lower probability of false alarm was desired, after Part-2 has been successfully received, although in some applications, this might slightly disadvantage reception of single sub-frame transmissions. Alternatively, for non-HSDPA data, the diversity branch may be enabled after the first frame has been received (in the case of HSDPA this could be the HS-SCCH or HS-DSCH) whereupon the inactivity timer is reset, as discussed above.

According to another aspect of the disclosure, diversity receive mode operation is controlled depending upon whether the wireless mobile communications device is in soft handoff, for example, the wireless mobile communications station is operated in diversity receive mode during soft handoff periods, i.e., where the mobile station is simultaneously receiving transmissions from more than one base station, and the wireless mobile communications station is not operated in diversity mode during periods other than soft handoff periods.

In one embodiment, diversity receive mode is enabled if an active set of base stations serving the wireless mobile communications station is increased. Alternatively, diversity receive mode is enabled if demodulation resources are assigned after the active set of base stations serving the wireless mobile communications station is increased.

According to another aspect of the disclosure, diversity reception mode operation is controlled depending upon an estimated signal to noise ratio (SNR) of a received signal before or without any demodulation of the received signal. In one embodiment, diversity reception is enabled in the wireless mobile communications station when the estimated signal to noise ratio is less than a specified threshold.

In FIG. 8, at block 810, the mobile wireless communications device receives a pilot signal, and at block 820 the device estimates a signal to noise ratio of the pilot signal. At block 830, diversity reception is enabled in the wireless mobile communications station if the estimated signal to noise ratio of the pilot is less than a specified threshold. In the exemplary UMTS wireless communications application, the mobile wireless communications device estimates the signal to noise ratio of the received signal by estimating Ec/Io, which is a ratio of received pilot chip energy to interference plus noise power spectral density. In this exemplary application, diversity reception is enabled in the wireless mobile communications station when Ec/Io is less than a specified threshold.

According to yet another aspect of the disclosure, diversity reception mode operation is controlled depending upon the downlink data rate or the anticipated downlink data rate of the wireless mobile communications station. In FIG. 9, at block 910, the data or anticipated data rate is determined, and at block 920 diversity mode operation is controlled based upon the data rate, for example, diversity reception is enabled in the wireless mobile communications station if the data rate or anticipated data rate exceeds a specified threshold. In one application, for example, an anticipated downlink data rate is estimated based upon radio link configuration information received by the wireless communications device, for example, a Link Access Rate and/or a Radio Access Bearer definition assigned to the wireless communications device by the network.

In another embodiment, the anticipated downlink data rate for the wireless mobile communications station is determined in an application layer, and diversity reception is enabled in the wireless mobile communications station in response to a Java API command if the anticipated data requirement exceeds a threshold.

According to some embodiments of the disclosure, diversity reception mode operation is controlled based upon one or more of the distance of the wireless mobile communications station from a serving cell, an estimated level of the battery of the wireless mobile communications station, and/or a ratio of despread signal power to despread power of cell interferers at the wireless mobile communications station. These and the other bases disclosed herein for controlling diversity may be used alone or in combination.

Generally, power control may be modified prior to operating or not operating the wireless mobile communications station in diversity reception mode. In one embodiment, power control is modified by changing an inner loop set point for comparison of a power control metric in determining power control commands. In another embodiment, power control is modified by changing the power control metric used for comparison to the inner loop set point in determining power control commands.

In anticipation of enabling or disabling the diversity reception mode, the power control threshold used as an inner loop set point and controlled by the wireless mobile communications station can be adjusted to largely reflect the change caused by enabling or disabling diversity reception mode and thereby avoid disrupting the inner loop power control since the power control metric is impacted by enabling and disabling diversity reception mode and is compared to the set point to determine the power control commands (or bit) sent on the uplink to the active set of base stations. Alternatively, the power control metric itself could be adjusted in anticipation of enabling or disabling the diversity reception mode. The power control metric is computed from downlink dedicated pilot symbols for WCDMA and from the power control bit symbols punctured on the forward link fundamental or dedicated control channel for CDMA (IS95, IS2000, 1xEVDV).

In FIG. 10, Table 2 shows that on average 11 to 12% current drain reductions may be obtained for a data user diversity mode disabled upon being instructed to go into the CELL_FACH intermediate state, which in the example occurs after about 4 seconds. Alternatively, the data user could use its own inactivity timer and turn off the diversity branch after 1 second even though the Node-B inactivity timer has not yet expired and the user equipment is still in the CELL_DCH (active) state in which case the current drain reduction is about 14 to 16%.

For voice users, a 9% current drain reduction is obtained on average if the diversity branch is turned off when the user is not in any kind of soft handoff as shown in Table 2. Another strategy where the voice user's diversity branch is disabled if good pilot Ec/Io is measured reduces current drain by about 6%. The current drain benefit for voice users for the soft handoff scheme assumes that time spent in the different handoff states is equal to the percentage area coverage of the handoff states. Effectiveness will vary if a user stays in certain handoff states longer than others. This restriction applies to the pilot Ec/Io scheme as well.

The previous analysis does not account for the current drain of the power amplifier but only the baseband, receive and transmit circuitry. When the power amplifier is considered, the current drain percentage reduction obtained is slightly lower. For the case where the power amplifier draws 100 mA compared to 0 mA, the change in current drain percentage reduction obtained is less than 0.5%. For voice users the change in current drain percentage reduction obtained is about 1%.

In FIG. 11, Table 3 shows the current drain reduction for the data users by using both the soft handoff/pilot Ec/Io schemes and the user equipment inactivity timer scheme (CELL_DCH), which results in an additional 1% reduction relative to only using the user equipment inactivity timer scheme. These combined schemes may be appropriate if a given manufacturer's user equipment was one of the only ones with rx diversity deployed in a network and the manufacturer wants to preserve the user equipment's battery life so that it is equivalent to competitors but still exhibits perceptible performance benefit.

Note that for packet calls consisting of data packets for bursty data traffic such as web browsing and separated by random time intervals corresponding to a user read time, the delay in delivering the entire packet call can be significantly reduced by enabling diversity reception mode and by as much as 50%. By disabling diversity reception during the intermediate state between active and idle modes (e.g. CELL_FACH state in WCDMA) and employing a timer such that diversity reception is disabled when packet information is not received, then the user equipment's battery life can actually be increased instead of having diversity reception cause a net loss in user equipment battery life.

While the present disclosure and what are considered presently to be the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communications station having a diversity receive branch, the method comprising:
   determining a channel quality indicator with the diversity receive branch enabled,
   determining a channel quality indicator with the diversity receive branch disabled;
   determining a difference between the channel quality indicator determined with the diversity receive branch disabled and the channel quality indicator determined with the diversity receive branch enabled;
   selectively operating diversity mode based upon a comparison of the difference with a threshold.

2. The method of claim 1, wherein selectively operating the diversity mode includes
   operating the diversity receive branch when the difference exceeds a first threshold,
   not operating the diversity receive branch when the difference does not exceed a second threshold, which is different from the first threshold.

3. The method of claim 1, wherein selectively operating the diversity mode includes:
   operating the diversity receive branch when the difference exceeds a first difference threshold,
   not operating the diversity receive branch when the difference does not exceed the first difference threshold.

4. The method of claim 1, wherein the wireless communications station includes a single antenna, a primary receive branch and a diversity receive branch both coupled to the single antenna, the method comprising
   receiving a signal with the single antenna,
   determining the channel quality indicator for the signal received by the single antenna when the diversity receive branch is enabled,
   determining the channel quality indicator for the signal received by the single antenna when the diversity receive branch is disabled.

5. A method in a wireless mobile communications station having diversity receive mode capability, the method comprising:
   receiving packet information at the wireless mobile communications station;
   operating the wireless mobile communications station in diversity reception mode when receiving packet information,
   not operating the wireless mobile communications station in diversity reception mode when no additional packet information is received within a specified time interval after receiving the packet information.

6. The method of claim 5,
   starting a timer upon first receiving the packet information,
   resetting the timer if new packet information is received,
   disabling diversity if the timer expires.

7. The method of claim 5,
   receiving packet information includes detecting a control channel associated with the packet information,
   enabling the diversity receive branch if the control channel is detected.

8. The method of claim 7,
   the control channel has first and second parts,
   enabling the diversity receive branch if at least one of the first and second parts of the control channel is detected.

9. The method of claim 7,
   setting a timer upon detecting the control channel associated with the packet information,
   disabling diversity if the timer expires.

10. The method of claim 9,
    re-setting a timer upon detecting a subsequent control channel associated with subsequent packet information.

11. The method of claim 5,
    disabling diversity if no additional packet information is received within a specified time interval associated with the packet information.

12. The method of claim 5,
    modifying power control prior to operating or not operating the wireless mobile communications station in diversity reception mode.

13. A method in a wireless mobile communications station having diversity receive mode capability, the method comprising:
    transitioning the wireless mobile communications station between an intermediate state and active and dormant states;
    controlling the diversity receive mode capability when transitioning to and from the intermediate state.

14. The method of claim 13, controlling the diversity receive mode capability upon transitioning to and from the intermediate state includes before and after transitioning to and from the intermediate state.

15. The method of claim 13,
    the intermediate state is a channel maintenance state,
    not operating the diversity receive mode in the channel maintenance state.

16. The method of claim 15, operating in the diversity receive mode in the active state.

17. The method of claim 13, the intermediate state is a FACCH state, disabling diversity receive mode when in the FACCH state.

18. A method in a wireless mobile communications station having diversity receive mode capability, the method comprising:
    receiving a signal;
    estimating a signal to noise ratio of the received signal without first demodulating the received signal;
    enabling diversity reception in the wireless mobile communications station when the estimated signal to noise ratio is less than a specified threshold.

19. The method of claim 18,
    receiving the signal includes receiving a pilot signal;
    estimating the signal to noise ratio of the received signal by estimating a signal to noise ratio of the pilot signal;
    enabling diversity reception in the wireless mobile communications station if the estimated signal to noise ratio of the pilot is less than a specified threshold.

20. The method claim 18,
    estimating a signal to noise ratio of the received signal by estimating $Ec/Io$,
    enabling diversity reception in the wireless mobile communications station if the $Ec/Io$ estimation is less than a specified threshold.

21. A method in a wireless mobile communications station having diversity receive mode capability, the method comprising:
    determining an anticipated downlink data rate for the wireless mobile communications station;
    enabling diversity reception in the wireless mobile communications station if the anticipated data rate exceeds a specified threshold.

22. The method of claim 21,
    determining the anticipated downlink data rate for the wireless mobile communications station includes receiving a radio link configuration information.

23. The method of claim 21,
 determining the anticipated downlink data rate for the wireless mobile communications station includes determining a data requirement in an application layer;
 enabling diversity reception in the wireless mobile communications station in response to a Java API command if the data requirement exceeds a threshold.

24. A method in a wireless mobile communications station having diversity receive mode capability, the method comprising:
 determining an estimated distance of the wireless mobile communications station from a serving cell;
 controlling diversity reception in the wireless mobile communications station based upon the distance of the wireless mobile communications station from the serving cell.

25. A method in a wireless mobile communications station having diversity receive mode capability, the method comprising:
 determining an estimated level of a battery of the wireless mobile communications station;
 controlling diversity reception in the wireless mobile communications station based upon the estimated level of the battery of the wireless mobile communications station.

26. A method in a wireless mobile communications station having diversity receive mode capability, the method comprising:
 determining a ratio of despread signal power to despread power of cell interferers at the wireless mobile communications station;
 controlling diversity reception in the wireless mobile communications station based upon the ratio of despread signal power to despread power of cell interferers at the wireless mobile communications station.

\* \* \* \* \*